(No Model.)  3 Sheets—Sheet 1.

J. JACOBS.
ILLUMINATING TILE.

No. 402,930. Patented May 7, 1889.

Witnesses
Chas. J. Williamson.
Henry C. Hazard.

Inventor
Jacob Jacobs, by
Crindle & Russell, his Attys (No Model.) 3 Sheets—Sheet 2.
J. JACOBS.
ILLUMINATING TILE.

No. 402,930. Patented May 7, 1889.

Witnesses
Chas. J. Williamson
Henry C. Hazard

Inventor
Jacob Jacobs, by
Prindle & Russell, his Attys (No Model.) 3 Sheets—Sheet 3.
J. JACOBS.
ILLUMINATING TILE.
No. 402,930. Patented May 7, 1889.
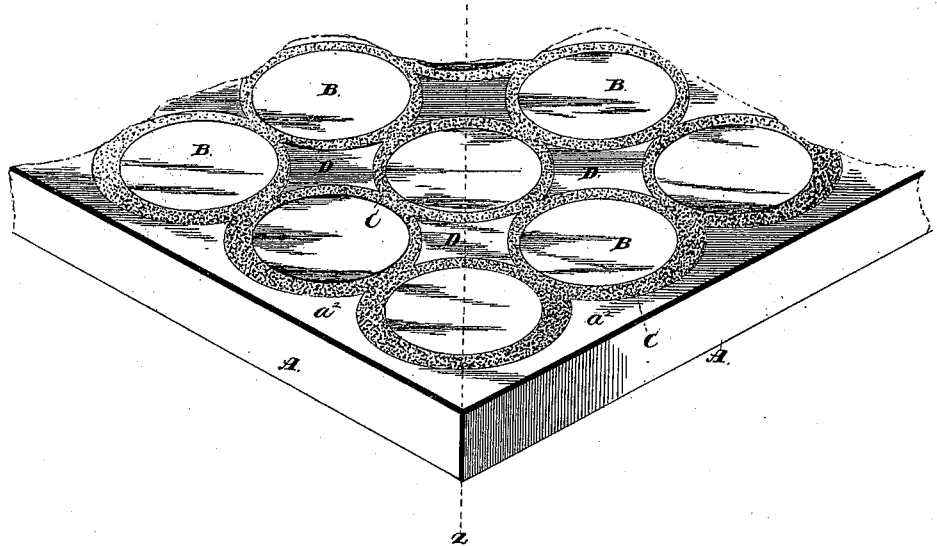
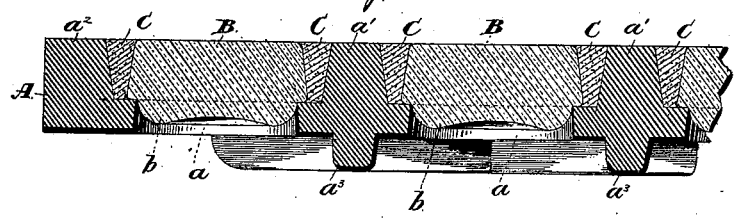
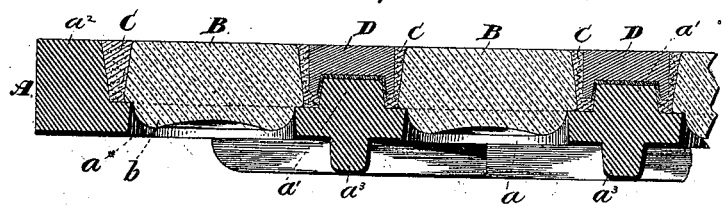
Witnesses
Chas. J. Williamson.
Henry C. Hazard.
Inventor
Jacob Jacobs, by
Prindle & Russell, his Attys

UNITED STATES PATENT OFFICE.

JACOB JACOBS, OF NEW YORK, N. Y.

ILLUMINATING-TILE.

SPECIFICATION forming part of Letters Patent No. 402,930, dated May 7, 1889.

Application filed March 9, 1889. Serial No. 302,591. (No model.)

*To all whom it may concern:*

Be it known that I, JACOB JACOBS, of New York, in the county of New York, and in the State of New York, have invented certain new and useful Improvements in Illuminating-Tiles; and I do hereby declare that the following is a full, clear, and exact description thereof, reference being had to the accompanying drawings, in which—

Figure 1:
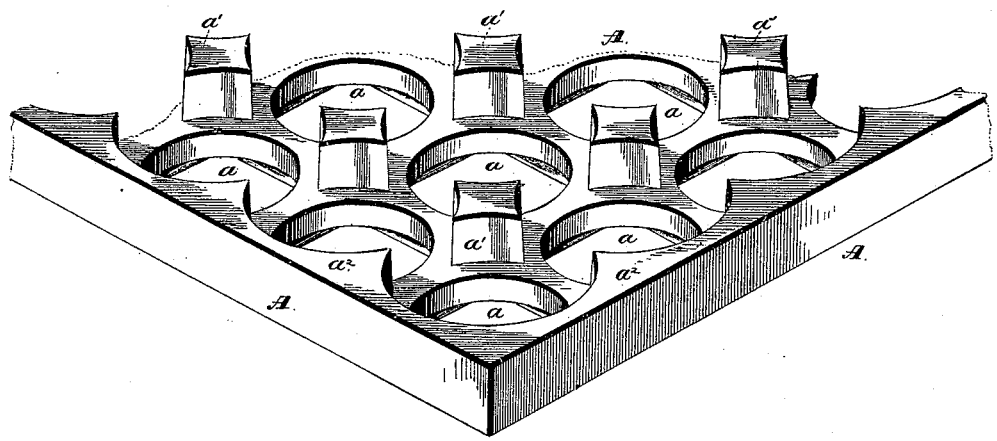
Figure 2:
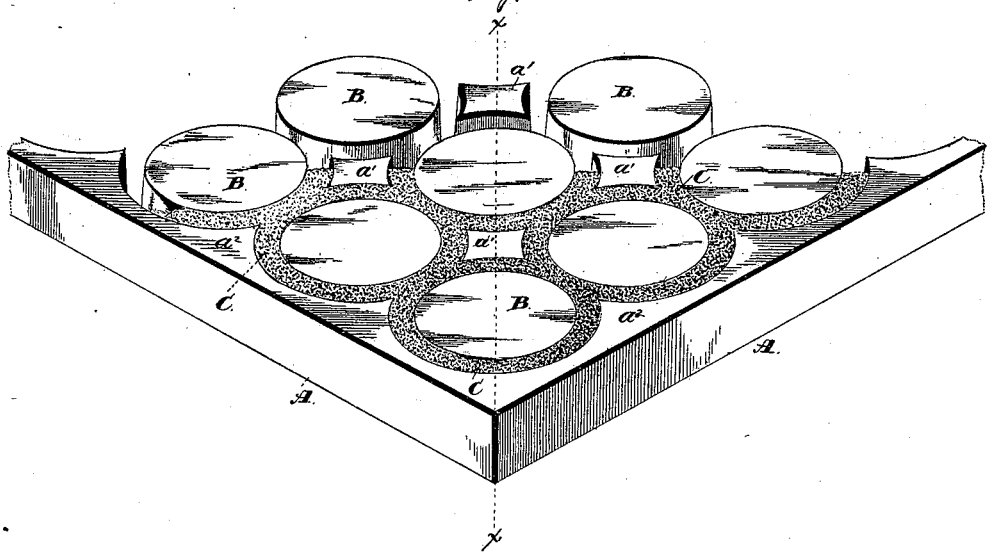
Figure 3:
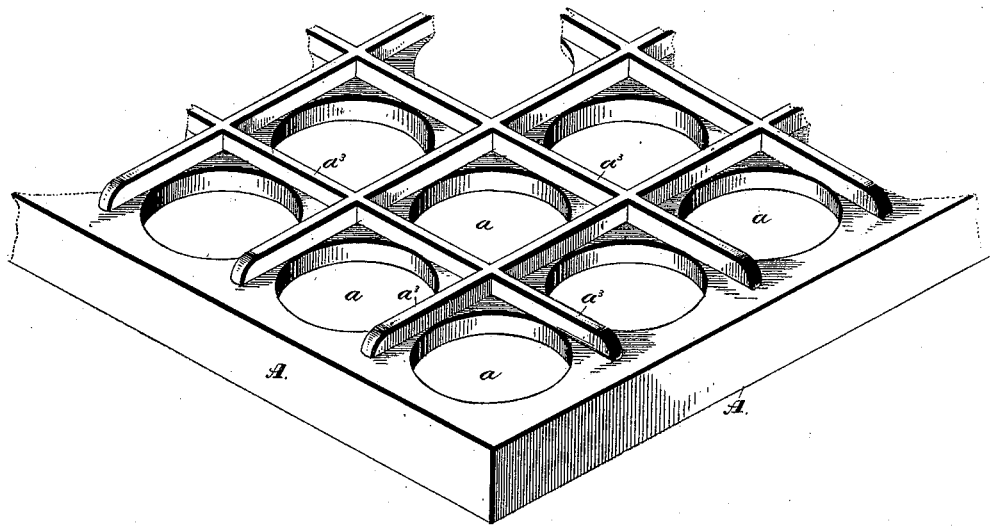
Figure 4:
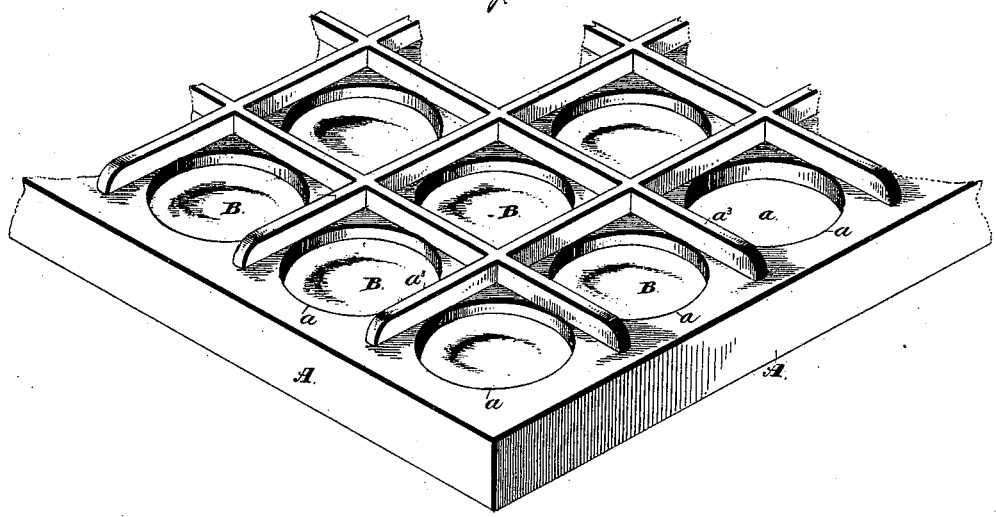

Figure 1 is a perspective view of the metal plate or body of my tile before the lenses are placed in position. Fig. 2 is a like view of the tile, the principal portion of the same being complete and a part having the lenses in position, but not cemented. Figs. 3 and 4 are perspective views of the lower side of said plate, and show, respectively, the light-openings unfilled and filled by lenses. Fig. 5 is a like view of said tile, provided with vitrified coverings for the metal lugs between the lenses; and Figs. 6 and 7 are sections upon lines $x\ x$ and $z\ z$, respectively, of Figs. 2 and 5.

Letters of like name and kind refer to like parts in each of the figures.

The design of my invention is to secure a large increased light-transmitting area of an illuminating-tile; and to such end my invention consists, principally, in an illuminating-tile in which the lenses are separated and located solely by means of lugs that are formed upon and project upward from the body of the tile at points midway between the contiguous light-openings, substantially as and for the purpose hereinafter specified.

It consists, further, in an illuminating-tile in which is combined a metal body that is provided with light-openings which have no surrounding curbs, and between such light-openings is provided with upwardly-projecting lugs, glass lenses which are placed over the light-openings, and cement or other like material that is placed within and caused to fill the space between the lenses, substantially as and for the purpose hereinafter shown.

It consists, further, in an illuminating-tile in which is combined a metal body that is provided with light-openings and upwardly-projecting lugs between the same, glass lenses which are placed over the light-openings, a cement that is placed within and caused to fill the spaces between said lenses, and encaustic tiles which are embedded within the cement over each of the lugs, substantially as and for the purpose hereinafter set forth.

It consists, further, in an illuminating-tile in which the metal body is provided upon its lower face with a series of straight intersecting ribs that are located in each space between the contiguous light-openings, substantially as and for the purpose hereinafter shown and described.

It consists, finally, in an illuminating-tile in which the metal body is provided with light-openings that are without curbs, and upon its upper face has upwardly-projecting lugs between such openings, and upon its lower face is provided with straight intersecting ribs that are located between said openings, substantially as and for the purpose hereinafter specified.

In the carrying of my invention into practice I employ a metal plate, A, which has any desired size or shape horizontally, and is provided with parallel rows of circular light-openings $a$ and $a$, that are placed near each other, as shown. Between the light-openings $a$ and $a$ are provided lugs $a'$ and $a'$, which project upward from the plate A, and have each of their sides formed upon lines that are concentric with the contiguous openings. Around the edges of said plate there is preferably formed an upwardly-projecting flange, $a^2$, which exteriorly is flush with said edges and interiorly follows the lines of the adjacent rows of openings $a$ and $a$, so that its inner edge is composed of a series of connecting semicircular faces, each of which is concentric with one of said light-openings. Upon the lower face of the plate or tile A are formed intersecting ribs $a^3$ and $a^3$, which are located between the light-openings $a$ and $a$, and have such thickness and depth as will give to said plate the necessary rigidity to adapt it to the position it is to occupy, so that any desired strength may be secured without other change than in the size of said ribs. Over each light-opening $a$ is placed a lens, B, which is round in plan view, and in vertical section has preferably the form shown in Fig. 7, its body from the upper face of the tile A having an upwardly-decreasing diameter, while upon its lower side said lens is provided with a boss, $b$, that extends downward into said opening.

After the lenses B and B are in position upon the tile A the spaces between the same, the lugs $a'$ and $a'$, and the flange $a^2$ (if a flange is provided) are filled with a cement, C, which is capable of being applied in a plastic form and will afterward harden, so as to make a walking-surface that is flush with the upper faces of said lenses and lugs.

For the purpose of giving to the tile an ornamental appearance the upper ends of the lugs $a'$ and $a'$ may have an ornamental form, or they may have such height as to permit an encaustic tile, D, to be placed over each lug, as shown in Figs. 5 and 7, in which last-named construction the walking-surface would be composed of glass, encaustic tiles, and cement, with no iron in sight, except around the edges in case of the employment of the marginal flange.

The tile thus constructed is capable of use in any position, as its strength may be readily adapted to the purpose and position, while in consequence of the omission of curbs around the light-openings the latter may be placed nearer to each other than would otherwise be practicable, and thereby a large increase in illuminating area secured.

Having thus described my invention, what I claim is—

1. An illuminating-tile in which the lenses are separated and located solely by means of lugs that are formed upon and project upward from the body of the tile at points midway between the contiguous light-openings, substantially as and for the purpose specified.

2. An illuminating-tile in which is combined a metal body that is provided with light-openings which have no surrounding curbs and between such light-openings is provided with upwardly-projecting lugs, glass lenses which are placed over the light-openings, and cement or other like material that is placed within and caused to fill the spaces between the lenses, substantially as and for the purpose shown.

3. An illuminating-tile in which is combined a metal body that is provided with light-openings and upwardly-projecting lugs between the same, glass lenses which are placed over the light-openings, a cement that is placed within and caused to fill the spaces between said lenses, and encaustic tiles which are embedded within the cement over each of the lugs, substantially as and for the purpose set forth.

4. An illuminating-tile in which the metal body is provided upon its lower face with a series of straight intersecting ribs that are located in each space between the contiguous light-openings, substantially as and for the purpose shown and described.

5. An illuminating-tile in which the metal body is provided with light-openings that are without curbs, and upon its upper face has upwardly-projecting lugs between such openings, and upon its lower face is provided with straight intersecting ribs that are located between said openings, substantially as and for the purpose specified.

In testimony that I claim the foregoing I have hereunto set my hand this 2d day of March, 1889.

JACOB JACOBS.

Witnesses:
GEO. S. PRINDLE,
JAS. E. HUTCHINSON.